United States Patent [19]
Arai et al.

[11] 3,917,653
[45] Nov. 4, 1975

[54] N,N-DISUBSTITUTED HYDROXYLAMINES

[75] Inventors: Atsuaki Arai; Mitsugu Tanaka, both of Minami-ashigara, Japan

[73] Assignee: Fuji Photo Film Co., Ltd., Minami-ashigara, Japan

[22] Filed: Dec. 26, 1973

[21] Appl. No.: 428,574

[30] Foreign Application Priority Data
Dec. 25, 1972  Japan.................................. 48-260

[52] U.S. Cl............ 260/345.1; 260/347.7; 96/29 R; 96/61 M; 96/66 R
[51] Int. Cl.².............. C07D 307/14; C07D 309/06
[58] Field of Search............ 260/345.9, 347.7, 345.1

[56] References Cited
UNITED STATES PATENTS
2,173,711    8/1939    Clifford.................................. 18/50

OTHER PUBLICATIONS
Roberts et al. "Organic Chemistry" 1965 p. 673.
Warrener et al. C. A. Vol. 65 1966 p. 5458c.

*Primary Examiner*—Harry I. Moatz
*Attorney, Agent, or Firm*—Sughrue, Rothwell, Mion, Zinn & Macpeak

[57] ABSTRACT

N,N-disubstituted hydroxylamines represented by the following formula (I):

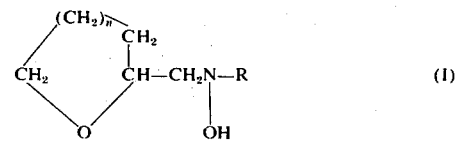

wherein R represents an alkyl group, a hydroxyalkyl group, an alkoxyalkyl group, an alkoxyalkoxyalkyl group, an alkenyl group or a tetrahydrofurfuryl group, and $n$ is 1 or 2. These amines are useful as photographic agents, especially as developers for use in the photographic diffusion transfer process.

6 Claims, No Drawings

N,N-DISUBSTITUTED HYDROXYLAMINES

BACKGROUND OF THE INVENTION

This invention relates to N,N-disubstituted hydroxylamines, and in particular, to N,N-disubstituted hydroxylamines.

SUMMARY OF THE INVENTION

This invention provides N,N-disubstituted hydroxylamines of the following formula (I):

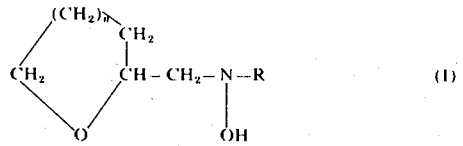

wherein R represents an alkyl group, a hydroxyalkyl group, an alkoxyalkyl group, an alkoxyalkoxyalkyl group, an alkenyl group or a tetrahydrofurfuryl group, and n is 1 or 2.

DETAILED DESCRIPTION OF THE INVENTIN

These amines of the formula I above are novel compounds which have not as yet been described in the art, and are useful as photographic agents, especially as developers for use in the black-white diffusion transfer process. Specific examples of the use of N,N-disubstituted hydroxylamines as a developer are described in copending application Ser. No. 427,878, filed Dec. 26, 1973, now Pat. No. 3,864,131, and assigned to a common assignee with this application.

These amines of the formula I above can be prepared by treating the corresponding secondary amines with an oxidizing agent, generally in the presence of a solvent.

In the above described formula I representing the N,N-disubstituted hydroxylamines of this invention, the substituent R represents a monovalent radical from 1 to 8 carbon atoms, preferably 1 to 6 carbon atoms, for example, an alkyl group such as a methyl, ethyl, propyl, isopropyl, isobutyl, sec-butyl, n-butyl, pentyl, iso-pentyl or sec-pentyl group; a hydroxyalkyl group such as a hydroxyethyl, 2-hydroxypropyl, 3-hydroxypropyl, 2-hydroxybutyl or 3-hydroxybutyl group; an alkoxyalkyl group such as a methoxyethyl, 2-methoxypropyl, 3-methoxypropyl, 2-methoxybutyl, 4-methoxybutyl, 2-ethoxyethyl, 2-ethoxypropyl or 3-ethoxypropyl group; an alkoxyalkoxyalkyl group such as a methoxyethoxyethyl or ethoxyethoxyethyl group; and alkenyl group such as an allyl or crotyl group; or a tetrahydrofurfuryl group.

These amines of the formula I can be prepared by treating the corresponding secondary amines with an oxidizing agent such as hydrogen peroxide or peracetic acid generally in a solvent (for example, water, methanol, ethanol, propanol, etc.) using a concentration of from about 5 to 50, preferably 20 to 40 weight percent of the secondary amine starting material. The oxidizing agent is generally used in an amount of about 0.5 to 10, preferably 1 to 2 molar equivalents to the secondary amine starting material. The reaction temperature is determined in relation to the reaction time, and the latter is about 10 minutes to about 20 hours, more generally 30 minutes to 5 hours, at a reaction temperature of about 10° to 70°C or so, preferably 40° to 60°C.

The secondary amines which are used as starting materials for preparing the N,N-disubstituted hydroxylamines of this invention can easily be prepared by reaction of the corresponding primary amines of the general formula $RNH_2$ wherein R is as defined previously with compounds of the following formula (II):

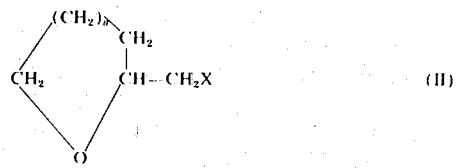

wherein X represents a chlorine, bromine or iodine atom and n has the same meaning as described above, such as tetrahydrofurfuryl halide, for example, at about 10° to 150°C, preferably 100° to 150°C, and for about 10 minutes to 30 hours, more generally 3 hours to 15 hours. In this preparation, the reaction can be carried out in the presence of a solvent (such as water or an alcohol, e.g., methanol, ethanol, propanol, etc.) or in the absence of any solvent. The primary amine is preferably used in an excess amount over the reactant halide of the formula (II), and in general, can be used in an amount of 1.2 to 20 times (molar ratio) of the reactant halide of the formula (II). In addition, it is possible to incorporate an alkaline substance such as sodium carbonate, potassium carbonate, sodium bicarbonate, or a basic anion exchange resin in the reaction system, for the purpose of neutralizing the hydrogen halide produced during the reaction. The preparation of compounds of the general formula (II) is known and disclosed, for example, in "Organic Synthesis Col.," 3, 698, 793 (1943).

Other methods for the synthesis of the starting material secondary amines includes a method for the reduction of dialkylamides, a method for the hydrolysis of dialkylcyanamides obtained by reaction of an alkyl halide and a cyanamide, etc., as disclosed, for example, "J. Am. Chem. Soc.," 71, 274 (1949) and "Organic Synthesis Col.," 1, 201 (1943).

The thus prepared secondary amine can be separated from the reaction mixture according to conventional methods. For example, the reaction mixture can be poured into water, extracted with a solvent such as diethyl ether, dried with anhydrous sodium sulfate and then distilled under reduced pressure, whereby the product is recovered.

Another component or an oxidizing agent which can be used for the preparation of the N,N-disubstituted hydroxylamines of this invention is preferably a peroxide, and in particular, hydrogen peroxide is especially advantageous therefor. The amount of the oxidizing agent which is used is from 0.5 to 2 moles, preferably about 1.0 to 1.5 moles, per 1 mole of the secondary amine.

After completion of the reaction, the hydroxylamine compound of the formula I is separated from the reaction mixture according to conventional methods. For example, the reaction mixture can be extracted, for example, with chloroform or the like, dried, for example, with sodium sulfate or the like and then distilled under reduced pressure, e.g., at 0.01 to 4 mmHg, preferably 0.1 to 1 mmHg, whereby the product is recovered. Thin-layer chromatography or gas chromatography confirmed that the hydroxylamines thus prepared are of high purity.

N,N-disubstituted hydroxylamines of the above formula I of this invention are novel compounds which have not as yet been described in the art, and are useful as photographic agents, especially as developers for use in the black-white diffusion transfer process or the like.

Representative examples of amines of this invention of the formula I are

Compound No. 1 : N-Ethyl-N-tetrahydrofurfurylhydroxylamine
Compound No. 2 : N-n Butyl-N-tetrahydrofurfurylhydroxylamine
Compound No. 3 : N-Methoxyethyl-N-tetrahydrofurfurylhydroxylamine
Compound No. 4 : N-Ethoxyethyl-N-tetrahydrofurfurylhydroxylamine
Compound No. 5 : N-Methoxyethoxyethyl-N-tetrahydrofurfurylhydroxylamine
Compound No. 6 : N-Allyl-N-tetrahydrofurfurylhydroxylamine
Compound No. 7 : N,N-Ditetrahydrofurfurylhydroxylamine
Compound No. 8 : N-Ethyl-N-(2-tetrahydropyranylmethyl)-hydroxylamine Compound No. 1 is in particular preferred.

Some examples to more specifically illustrate the synthesis of amines of the present invention will be given hereunder to explain the present invention in greater detail. Unless otherwise indicated, all parts, percents, ratios and the like are by weight.

EXAMPLE 1

(N-Ethyl-N-tetrahydrofurfurylhydroxylamine)

1. 110g of tetrahydrofurfuryl chloride and 300cc of a 70% ethylamine aqueous solution were heated for 15 hours at 100°C in a sealed tube. 200cc of ice-water were poured into the reaction mixture, the resulting mixture was extracted three times each with 200cc of diethyl ether, the ether layer was washed with water and then dried with anhydrous sodium sulfate, and thereafter the ether was distilled off. The residue was distilled under reduced pressure, and a fraction having a boiling point of 60°–64°C/20mmHg was collected to obtain 80g of N-ethyl-N-tetrahydrofurfurylamine.

2. 51g of the N-ethyl-N-tetrahydrofurfurylamine obtained as described in the above step (1) and 50cc of water were put into a flask, 40g of a 35% aqueous soluiton of hydrogen peroxide was gradually added thereto over the course of about 30 minutes while stirring, and after the addition, the mixture was continuously stirred further for about 2 hours. This addition was accompanied by an exothermic reaction, resulting in an elevation of the temperature of the reaction system, and therefore, the entire system can be optionally put into an ice-water bath so as to keep the internal temperature thereof at 45° to 50°C. The reaction mixture was extracted with chloroform, the chloroform layer was dried with anhydrous sodium sulfate, and then, after the chloroform was distilled off, the residue was distilled under reduced pressure to collect a fraction having a boiling point of 79°– 80°C/0.6mmHg. The thus obtained fraction was the desired product to be obtained, having a sufficient practical purity as such. In addition, although the purity of the product was sufficiently practical, the following procedure was carried out for the further purification thereof. The obtained fraction was dissolved in 200cc of 1N sulfuric acid, and the resulting solution was washed 4 times each with 100cc of chloroform to remove any impurities. The aqueous layer was neutralized with sodium bicarbonate and then extracted four times each with 100cc of chloroform. After the chloroform layer was dried with anhydrous sodium sulfate, the chloroform was removed and the residue was distilled under reduced pressure. The product obtained after this purification had a melting point of 76°– 78°C/0.5mmHg, and the yield thereof was 25%.

Analysis: C, 57.59: H, 10.41: N, 9.70. Calculated: C 57.93: H, 10.34: N, 9.66.

EXAMPLE 2

(N-Ethoxyethyl-N-tetrahydrofurfurylhydroxylamine)

1. 152g of tetrahydrofurfuryl bromide and 250g of ethoxyethylamine were heated under reflux for 15 hours while stirring, and the resulting reaction mixture was poured into ice-water and then extracted three times each with 300cc of chloroform. After the chloroform layer was dried with anhydrous sodium sulfate, the chloroform was distilled off, and then, the residue was distilled under reduced pressure to collect a fraction having a boiling point of 69°– 72°C/1.3mmHg, whereby 150g of N-ethoxyethyl-N-tetrahydrofurfurylamine were obtained.

2. 31g of the N-ethoxyethyl-N-tetrahydrofurfurylamine obtained as described in the above step (1), 18cc of water and 18g of a 35% aqueous solution of hydrogen peroxide were processed under the same conditions as those described in step (2) of the Example 1, to obtain the desired product having a boiling point of 97°–98°C/0.3mmHg. The yield thereof was 30%.

Analysis: C, 57.23: H, 10.11: N, 7.39. Calculated: C. 57.14: H, 10.05: N, 7.41.

EXAMPLE 3

(N-Allyl-N-tetrahydrofurfurylhydroxylamine)

1. 149g of tetrahydrofurfuryl bromide and 200g of allylamine were heated under reflux for 7 hours while stirring. The resulting reaction mixture was poured into ice-water and then was extracted 3 times each with 200cc of chloroform, and then, after the chloroform layer was dried with anhydrous sodium sulfate, the chloroform was distilled off. The residue was distilled under reduced pressure and a fraction having a boiling point of 79°– 83°C/18mmHg was collected to obtain 141g of N-allyl-N-tetrahydrofurfurylamine.

2. 35g of N-allyl-N-tetrahydrofurfurylamine, 20cc of water and 25g of a 35% aqueous solution of hydrogen peroxide were processed under the same conditions as those described in step 2 of Example 1 to obtain the desired product having a boiling point of 82°– 84°C/0.5mmHg. The yield thereof was 23%.

Analysis: C, 61.15: H, 9.59: N, 8.70. Calculated: C, 61.15: H, 9.55: N, 8.92.

EXAMPLE 4

(N-n-butyl-N-tetrahydrofurfurylhydroxylamine)

1. 160g of N-n-butyl-N-tetrahydrofurfurylamine having a boiling point of 85°– 89°C/17mmHg were obtained from 150g of tetrahydrofurfuryl bromide and 230g of N-butylamine, in a manner quite similar to step 1 of Example 3 above.

2. 35g of the secondary amine obtained in step 1 above, 25cc of water and 23g of a 35% aqueous solution of hydrogen peroxide were processed under the same conditions as those described in step 2 of Example 1 to obtain the desired product having a boiling point of 86°– 88°C/0.4mmHg. The yield thereof was 25%.

Analysis: C, 62.31: H, 10.90: N, 8.01. Calculated: C, 62.43: H, 10.98: N, 8.09.

EXAMPLE 5

(N-Methoxyethyl-N-tetrahydrofurfurylhydroxylamine)

1. 143g of N-methoxyethyl-N-tetrahydrofurfurylamine having a boiling point of 64 – 68°C/1.3mmHg were obtained from 150g of tetrahydrofurfuryl bromide and 240g of methoxyethylamine, in a manner similar to step (1) of Example 2.

2. 29g of the secondary amine obtained in step 1 above, 20cc of water and 18g of a 35% aqueous solution of hydrogen peroxide were processed under the same conditions as those described in step (2) of Example 1 to obtain the desired product having a boiling point of 92°– 93°C/0.3mmHg. The yield thereof was 31%.

Analysis: C, 54.70: H, 9.61: N, 7.77. Calculated: C, 54.86: H, 9.71: N, 8.00.

EXAMPLE 6

(N,N-Ditetrahydrofurfurylhydroxylamine)

1 95g of N,N-ditetrahydrofurfurylamine having a boiling point of 80°– 85°C/1.0mmHg were obtained from 100g of tetrahydrofurfuryl bromide and 250g of tetrahydrofurfurylamine, in a manner similar to step 1 of Example 2.

2. 18.3g of the secondary amine obtained in step 1 above, 11cc of water and 11g of a 35% aqueous solution of hydrogen peroxide were processed in a manner similar to step 2 of Example 1 to obtain the desired product having a boiling point of 110°– 111°C/0.2mmHg. The yield thereof was 25%.

Analysis: C, 59.51: H, 9.39: N, 6.88. Calculated: C, 56.70: H, 9.45: N, 6.97.

EXAMPLE 7

(N-Methoxyethoxyethyl-N-tetrahydrofurfurylhydroxylamine)

1 100g of N-methoxyethoxyethyl-N-tetrahydrofurfurylamine having a boiling point of 90°– 94°C/1.0mmHg were obtained, from 139g of methoxyethoxyethyl chloride and 250g of tetrahydrofurfurylamine, in a manner similar to step 1 of Example 2.

2. 24.0g of the secondary amine obtained in step 1 above, 12cc of water and 12g of a 35% aqueous solution of hydrogen peroxide were processed in a manner similar to step 2 of Example 1 to obtain the desired product having a boiling point of 124°– 125°C/0.2mmHg. The yield thereof was 21%.

Analysis: C, 54.64: H, 9.42: N, 6.23. Calculated: C, 54.80: H, 9.59: N, 6.39.

EXAMPLE 8

(N-Ethyl-N-(2-tetrahydropyranylmethyl)hydroxylamine)

1. 75g of N-ethyl-N-(2-tetrahydropyranylmethyl)amine having a boiling point of 70°– 75°C/20mmHg were obtained from 110g of tetrahydropyran-2-methylchloride and 300cc of a 70% aqueous solution of ethylamine, in a manner similar to step 1 of Example 1.

2. From 50g of the secondary amine obtained in step (1) above, 50cc of water and 38g of a 35% aqueous solution of hydrogen peroxide was obtained the desired product having a boiling point of 85°– 87°C/0.5mmHg, in a manner similar to step 2 of Example 1. The yield thereof was 23%.

Analysis: C, 60.12: H, 10.52: N, 8.63. Calculated: C, 60.30: H, 10.69: N, 8.81.

While the invention has been described in detail and with reference to specific embodiments thereof, it will be apparent to one skilled in the art that various changes and modifications can be made therein wherein departing from the spirit and scope thereof.

What is claimed is:

1. An N,N-disubstituted hydroxylamine represented by the following formula (I):

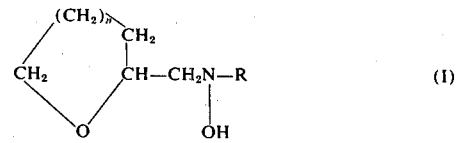

wherein R represents alkyl, hydroxyalkyl, alkoxyalkyl, alkoxyalkoxyalkyl, alkeny or tetrahydrofurufuryl, n is 1 or 2, and wherein said R has 1 to 8 carbon atoms.

2. The N,N-disubstituted hydroxylamine as claimed in claim 1, wherein said R is methyl, ethyl, propyl, iso-propyl, iso-butyl, sec-butyl, n-butyl, pentyl, iso-pentyl or sec-pentyl.

3. The N,N-disubstituted hydroxylamine as claimed in claim 1, wherein said R is hydroxyethyl, hydroxyethoxyethyl, hydroxypropyl or hydroxybutyl.

4. The N,N-disubstituted hydroxylamine as claimed in claim 1, wherein said R is methoxyethyl, methoxypropyl, methoxybutyl, ethoxyethyl or ethoxypropyl.

5. The N,N-disubstituted hydroxylamine as claimed in claim 1, wherein said R is methoxyethoxyethyl or ethoxyethoxyethyl.

6. The N,N-disubstituted hydroxylamine as claimed in claim 1, wherein said R is allyl or crotyl.

* * * * *